UNITED STATES PATENT OFFICE.

HANS GOLDSCHMIDT, OF ESSEN-ON-THE-RUHR, GERMANY.

MANUFACTURE OF ALLOYS OF SILICON.

No. 915,172.

Specification of Letters Patent.

Patented March 16, 1909.

Application filed April 24, 1908. Serial No. 428,933.

*To all whom it may concern:*

Be it known that I, HANS GOLDSCHMIDT, a subject of the King of Prussia, German Emperor, and resident of Essen-on-the-Ruhr, in the German Empire, have invented certain new and useful Improvements in the Manufacture of Alloys of Silicon, of which the following is an exact specification.

This invention relates to the manufacture of alloys of silicon and one of the alkaline earth metals calcium, barium or strontium.

It has already been proposed on a laboratory scale to heat silicon and lime together in an electric furnace so as to produce a calcium silicon compound. In these experiments carried out by Moissan the reaction took place in the presence of carbon which doubtless had some effect on the reaction. Moissan comes to the conclusion that with an excess of lime in the mixture, a silicate of lime is formed in the furnace and not a calcium silicon alloy.

The object of the present invention is to produce a calcium silicon alloy or an alloy of silicon with barium or strontium free from carbon and in a commercially practical manner.

The invention consists in a process for manufacturing alloys of silicon with the alkaline metals calcium, barium or strontium by heating silicon or ferro-silicon in an electric furnace with an excess by weight of the oxid of calcium barium or strontium or salts of the same containing the oxids and decomposable by heat at ordinary furnace temperatures, said heating within the electric furnace being carried out in the presence of a flux, for the purpose of producing an easily crumbling slag from which particles or light grains of the alloy may be separated by screening.

In practice I have found that good results may be obtained by heating a mixture of two parts by weight of lime with one part by weight of silicon together with a flux in an electric furnace. In this way there is obtained a calcium-silicon alloy of about 40 parts by weight of calcium and 60 parts by weight of silicon, if a practically pure silicon is used. Instead of silicon, ferro-silicon may be used and further instead of lime carbonate of lime or any salt of calcium which produces lime when being heated may be used.

The alloys of calcium and silicon hitherto obtained by similar processes were not free from carbon present in the form of carbid of calcium, or the percentage of calcium in these alloys was a rather low one. As stated above, a calcium-silicon alloy free from carbon and containing up to about 40 per cent. of calcium is easily to be obtained by carrying out this process.

As I have mentioned above the addition of the flux is necessary to produce a slag which crumbles when getting cold instead of forming a solid slag. In this way the output is greater and nearly a complete one because the light grains of alloy can be separated from the slag by screening. A convenient flux to use is fluorid of calcium (fluor spar) which may be mixed with chlorid of calcium in the proportions of 15 parts of fluorid of calcium to 5-10 parts of chlorid of calcium and this mixture may be added to 100 parts of the above mentioned mixture of lime and silicon. The commencement of the reaction in the mass is indicated by the sinking down of the same.

It will be understood that instead of lime and lime compounds, barium or strontium compounds which produce the oxids of these alkaline earth metals when heated in a furnace to an ordinary temperature, may be used for the purpose of obtaining the corresponding alloys of the same with silicon under addition of a flux.

Having thus fully described the nature of my said invention what I desire to secure by Letters Patent of the United States is:—

1. Process for producing an alloy of silicon with an alkaline earth metal consisting in heating silicon or ferro-silicon with an excess of an oxid of the alkaline metal in an electric furnace in presence of a flux producing a crumbling slag.

2. Process for producing an alloy of silicon with calcium consisting in heating silicon or ferro-silicon with an excess of a calcium compound containing oxygen in an electric furnace together with a flux producing a crumbling slag.

3. Process for producing an alloy of silicon with calcium consisting in heating silicon or ferro-silicon with an excess of lime in an electric furnace in presence of a flux producing a crumbling slag.

4. Process for producing an alloy of silicon with calcium consisting in heating silicon or ferro-silicon with an excess of lime in an electric furnace in presence of a flux composed of fluor spar and calcium chlorid.

5. Process for producing an alloy of silicon with calcium consisting in heating silicon with lime in the proportions 1 to 2 in an electric furnace in presence of a flux composed of fluor spar and calcium chlorid.

HANS GOLDSCHMIDT.

Witnesses:
 L. M. WOHLGEMUTH,
 E. ALDENDORFF.